United States Patent [19]

Schönfelder et al.

[11] Patent Number: 4,798,714

[45] Date of Patent: Jan. 17, 1989

[54] PROCESS FOR THE PREPARATION OF SILICON NITRIDE LOW IN CARBON CONTENT

[75] Inventors: Lothar Schönfelder; Gerhard Franz, both of Krefeld, Fed. Rep. of Germany

[73] Assignee: Bayer Aktiengesellschaft, Leverkusen, Fed. Rep. of Germany

[21] Appl. No.: 915,403

[22] Filed: Oct. 6, 1986

[30] Foreign Application Priority Data

Mar. 13, 1986 [DE] Fed. Rep. of Germany ....... 3608352

[51] Int. Cl.$^4$ ..................... C01B 21/063; C01B 33/06
[52] U.S. Cl. ..................................... 423/344; 423/406
[58] Field of Search ................................ 423/344, 406

[56] References Cited

U.S. PATENT DOCUMENTS 4,122,152 10/1978 Mori et al. .................. 423/344
4,428,916 9/1979 Komeya et al. .............. 423/344
4,572,902 2/1986 Matano et al. ............... 423/344

FOREIGN PATENT DOCUMENTS 0035008 2/1984 Japan.
112607 6/1985 Japan.

OTHER PUBLICATIONS

Chemical Abstracts, Book 98, No. 8, Feb. 21, 1983.
Chemical Abstracts, Book 104, No. 4, Jan. 27, 1986.
Chemical Abstracts, Book 100, No. 26, Jun. 25, 1984.

Primary Examiner—John Doll
Assistant Examiner—Lori S. Freeman
Attorney, Agent, or Firm—Connolly and Hutz

[57] ABSTRACT

An improved process for preparation of silicon nitride powder having a low carbon content comprises treating silicon nitride powder with an atmosphere containing chlorine gas at temperatures from 600° to 1050° C. and then with an atmosphere containing gaseous oxygen.

8 Claims, No Drawings

PROCESS FOR THE PREPARATION OF SILICON NITRIDE LOW IN CARBON CONTENT

The present invention relates to a process for the preparation of silicon nitride powder having a low carbon content by the treatment of silicon nitride powder in an atmosphere containing gaseous chlorine.

BACKGROUND OF THE INVENTION

Silicon nitride is interesting as a raw material for ceramics materials which are potential substitutes for metals in many fields relating to the construction of apparatus and machinery subjected to heavy wear. These materials are required to be resistant to high temperatures, temperature shocks and corrosion over a wide temperature range.

The $Si_3N_4$ powders used for the preparation of such ceramic materials may be obtained by various chemical processes. Among the processes which have already been employed industrially for the production of $Si_3N_4$ powder, the process of carbothermal nitridation of $SiO_2$ (1) and the process of direct nitridation of silicon (2) are important due to the low cost and ready availability of the raw materials. Those processes are shown by the following chemical equations:

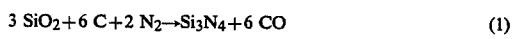

$$3 SiO_2 + 6 C + 2 N_2 \rightarrow Si_3N_4 + 6 CO \qquad (1)$$

$$3 Si + 2 N_2 \rightarrow Si_3N_4 \qquad (2)$$

The thermal and mechanical properties of materials based on $Si_3N_4$ depend to a large extent on the nature of the $Si_3N_4$ powder used and especially on the metallic and non-metallic impurities present in the powder. Among the non-metallic impurities, both oxygen and the carbon content are of primary importance.

In process (1) which is the carbothermal nitridation of $SiO_2$ with carbon in an atmosphere containing nitrogen, the reaction product is contaminated with carbon. The amount of carbon contamination is largely determined by the reaction conditions employed.

In the process of direct nitridation of silicon [equation (2)], the carbon contamination is introduced into the $Si_3N_4$ powder by impurities present in the raw material, in binders containing carbon or by impurities in the reaction atmosphere such as that present in high temperature nitridation furnaces heated with graphite.

$Si_3N_4$ powders contaminated with carbon are inferior in their sintering properties. The sintering densities are adversely influenced by the carbon (H. Hausner, R. Peitzsch in: Keramische Komponenten für Fahrzeug-Gasturbinen III, Statusseiminar im Auftrag des Bundesministeriums für Forschung und Technologie, 44–54, Springer-Verlag, Berling, 1984).

Apart from the adverse effect on the sintering characteristics of the $Si_3N_4$ powder, contamination with carbon greatly reduces the resistance of $Si_3N_4$ materials to oxidation at high temperature so that such materials are unsuitable for use at high temperatures (H. Knoch, G. E. Gazza Journal of the American Ceramic Society 62 (11–12), 634–635, 1979).

Although processes in which $Si_3N_4$ powder is produced from very pure compounds such as $SiH_4$ or $SiCl_4$ can result in the desired low carbon products, the $Si_3N_4$ powder obtained from these processes has the serious disadvantage in that materials obtained from such process by pressing have only low green densities and any subsequent sintering process is accompanied by excessive shrinkage.

A process for the after treatment of $Si_3N_4$ powder which has been prepared by direct nitridation of silicon is disclosed in Japanese Patent Application 216,031/83. In this process, the $Si_3N_4$ powder is heated in an atmosphere of gaseous chlorine at temperatures above 1100° C., preferably at 1300° C. This heat treatment is followed by annealing in an atmosphere containing nitrogen at temperatures above 1200° C., preferably at 1500° C. These conditions are said to result in a reduction in the carbon content. However, the process has the disadvantage of requiring the use of very high temperatures in corrosive gas atmosphere (such as chlorine) and the furnaces employed must conform to high technical standards.

It was therefore an object of the present invention to provide a process for the after treatment of $Si_3N_4$ powder to reduce the carbon content and in which the disadvantages of the processes according to the state of the art would be eliminated.

BRIEF DESCRIPTION OF THE INVENTION

It has surprisingly been found that $Si_3N_4$ powders having only a low carbon content can be obtained by the process of carbothermal nitridation or direct nitridation of silicon if the $Si_3N_4$ powders obtained by this process are subjected to a chemical after treatment with chlorine and then oxygen.

DETAILED DESCRIPTION

The present invention thus relates to a process for the preparation of silicon nitride powder having a low carbon content by treatment of the silicon nitride powder in an atmosphere containing chlorine gas, said treatment being carried out at temperatures from 600° to 1050° C. and followed by a subsequent treatment in an atmosphere containing gaseous oxygen.

This chlorine treatment is preferably carried out in the temperature range of 800° to 1050° C.

Inert gases such as $H_2$, $H_2$, noble gases or mixtures of these gases may be added as a carrier gas to the gaseous chlorine. Under the conditions of this chlorinating after treatment, the silicon-carbon compounds present are selectively converted into volatile $SiCl_4$ and elementary carbon. Free carbon is not attacked by chlorine under the conditions according to the invention. The whole carbon content in the form of free carbon and the carbon formed from the reaction of chlorine with silicon-carbon compounds can easily be eliminated by oxidation after annealing in the atmosphere of gaseous chlorine.

The process of annealing under oxidizing conditions is carried out in the presence of a gaseous oxidizing agent such as air or oxygen at temperatures from 500° to 1000° C., preferably at 600° to 800° C. $Si_3N_4$ powder is not attacked by oxidation under these conditions and selective removal of the carbon content is therefore achieved.

Under the conditions of the chlorinating treatment, no reaction takes place between the chlorine and the free carbon present. Consequently, the amount of chlorine required for the treatment is kept at a minimum and depends only on the amount of silicon-carbon compounds present in the $Si_3N_4$ powder.

The process according to the invention is particularly advantageous for silicon nitride powder which has been obtained by the reaction of silicon dioxide in a carbothermal nitridation.

In the process of carbothermal nitridation, $SiO_2$ is reacted with carbon in an atmosphere containing nitrogen at 1450° to 1550° C. to form $Si_3N_4$. Under these conditions, carburization with formation of silicon-carbon compounds takes place in addition to the nitridation of silicon. The amount of these carbon-containing compounds formed depends on the conditions of nitridation and the quality of raw materials put into the process.

For the preparation of $Si_3N_4$ powder by carbothermal nitridation of $SiO_2$, it is advantageous to use carbon in excess. The excess of carbon improves the rate of nitridation and increases the proportion of $Si_3N_4$ of the α-phase.

$Si_3N_4$ powder prepared by this method therefore contains a high proportion of residual carbon which must subsequently be removed from the $Si_3N_4$ powder by some suitable means. Removal of the carbon by the method indicated in Japanese Patent Specification No. 216,031/83, however, cannot be employed since the removal of the residual carbon by this method would consume very large quantities of expensive chlorine gas due to the formation of carbon-chlorine compounds.

If the process of after treatment according to the invention is carried out on $Si_3N_4$ powder which has been obtained by carbothermal nitridation of $SiO_2$ in the presence of an excess of carbon and therefore contains a high proportion of residual carbon in the form of free carbon in addition of silicon-carbon compounds, then the reaction mixtures obtained from the process of nitridation may be directly subjected to a chlorinating treatment followed by annealing under oxidizing conditions without any free carbon being chlorinated in this treatment and the high consumption of chlorine is therefore prevented.

After treatments of the crude $Si_3N_4$ powder by means of the atmospheres containing chlorine gas and atmospheres containing oxygen according to the invention may be carried out in a static or dynamic reaction bed in suitable furnaces. On an industrial scale it is, of course, suitable to use furnaces in which close contact between the gas and the surface of the solid is obtained by continuous circulation of the solid. Rotary furnaces, fluidized bed furnaces and shaft furnaces may be used for this purpose.

$Si_3N_4$ powder which has been obtained by the direct nitridation of silicon may also be treated by the process according to the invention to reduce the carbon content. The treatment in this case is again carried out under the conditions mentioned above of chlorination followed by annealing under oxidizing conditions.

The invention is described in the following examples which are not to be regarded as a limitation of the invention.

In the following examples, the carbon content of the $Si_3N_4$ was determined with a C-S-mat-analyser by combustion in a stream of oxygen.

EXAMPLES 1-7

$Si_3N_4$ powders prepared from quartz powder and carbon black by a process of carbothermal nitridation in a nitrogen atmosphere were treated in an atmosphere of chlorine gas at 1000° C. for the reaction times indicated in Table 1. The carbon was subsequently eliminated by oxidative treatment in air at 800° C.

Table 1 gives the analytically determined carbon contents of the crude $Si_3N_4$ powders before and after this after treatment. In comparison examples 6 B and 7 B, the $Si_3N_4$ powders were only subjected to an oxidative treatment in air without a treatment of annealing in the atmosphere of chlorine gas.

TABLE 1

| Example | Carbon content of crude $Si_3N_4$ powder (% by weight) | Chlorine treatment Time (h) | Carbon content (% by weight) of after treated $Si_3N_4$ powder |
|---|---|---|---|
| 1 | 6.7 | 1 | 0.32 |
| 2 | 4.3 | 1 | 0.60 |
| 3 | 1.5 | 1 | 0.42 |
| 4 | 1.0 | 2 | 0.40 |
| 5 | 0.9 | 3 | 0.40 |
| 6 A | 1.2 | 4 | 0.40 |
| 6 B Comparison Example | 1.2 | — | 0.98 |
| 7 A | 6.7 | 1 | 0.32 |
| 7 B Comparison Example | 6.7 | — | 6.10 |

EXAMPLE 8

$Si_3N_4$ powder was prepared by the process of carbothermal nitridation of $SiO_2$ with carbon in a nitrogen atmosphere. A dry mixture of finest quartz powder (specific surface area BET=4.5 $m^2/g$) was used as $SiO_2$ raw material and carbon black (specific surface area BET=20 $m^2/g$) as the source of carbon. The carbon black was used in a 3 times molar excess. Nitridation was carried out at 1520° C. for 10 hours. The product obtained had a carbon content of 60% by weight. This mixture was annealed in a chlorine gas atmosphere at 1000° C. for 2 hours and then tempered under oxidizing conditions in air at 800° C. for 6 hours.

The carbon content in the $Si_3N_4$ powder after this after treatment was 0.40% by weight.

EXAMPLES 9-15

Various commercially obtainable $Si_3N_4$ powders prepared by the process of direct nitridation of silicon were annealed in an atmosphere containing chlorine gas at 900° C. as in Example 1 and the elementary carbon was then removed by oxidation in air at 800° C.

The carbon contents of the powders used as starting materials and of the after treated $Si_3N_4$ powders are indicated in Table 2.

TABLE 2

| Example | $Si_3N_4$ powder Trade name | Carbon in crude powder (% by weight) | Carbon in after treated powder (% by weight) |
|---|---|---|---|
| 9 | ®H 2[1] | 0.31 | 0.11 |
| 10 | ®LC 1[1] | 0.16 | 0.02 |
| 11 | ®LC 12[1] | 0.13 | 0.02 |
| 12 | Denka SN-9FW[2] | 0.20 | 0.04 |
| 13 | Denka SN-B[2] | 0.18 | 0.06 |
| 14 | Kema P 75 L[3] | 0.29 | 0.09 |
| 14a | Kema P 75 L[3] | 0.29 | 0.27 |
| 15 | Kema P 95 H[3] | 0.28 | 0.11 |
| 15a | Kema P 95 H[3] | 0.28 | 0.25 |

In comprison Examples 14a and 15a, the $Si_3N_4$ powders were only annealed in air without after treatment with chlorine.
[1]Trade products of H.C. Starck, Berlin
[2]Trade products of Denka Denki Kagaku Kogyo, Japan
[3]Trade products of KemaNord Industrikemi, Sweden.

What is claimed is:

1. In the process for preparation of silicon nitride powder by treating silicon nitride powder with an atmosphere containing chlorine gas, the improvement comprises treating silicon nitride powder with an atmosphere containing chlorine gas at temperatures from 600° to 1050° C. and subsequently treating said silicon nitride with an atmosphere containing gaseous oxygen.

2. Process according to claim 1 wherein the treatment in the atmosphere containing chlorine gas is carried out at temperatures from 800° to 1050° C.

3. Process according to claim 1 wherein the treatment in the atmosphere containing gaseous oxygen is carried out at temperatures from 500° to 1000° C.

4. Process according to claim 3 wherein the treatment in the atmosphere containing chlorine gas is carried out at temperatures from 800° to 1050° C.

5. Process according to claim 1 wherein the treatment in the atmosphere containing oxygen is carried out at temperatures from 600° to 800° C.

6. Process according to claim 5 wherein the treatment in the atmosphere containing chlorine gas is carried out at temperatures from 800° to 1050° C.

7. In the process for preparation of silicon nitride powder by treating silicon nitride powder obtained by the reaction of silicon dioxide in a carbothermal nitridation, with an atmosphere containing chlorine gas, the improvement comprises treating silicon nitride powder with an atmosphere containing chlorine gas at temperatures from 600° to 1050° C. and subsequently treating said silicon nitride with an atmosphere containing gaseous oxygen.

8. Process according to claim 1 wherein the silicon nitride powder treated was obtained by direct nitridation of silicon.

* * * * *